Feb. 4, 1958  W. K. P. E. WIETHÜCHTER ET AL  2,822,193
EXPANSION COMPENSATOR WITH STRAIN RELIEVING SUPPORT MEANS
Filed May 24, 1954
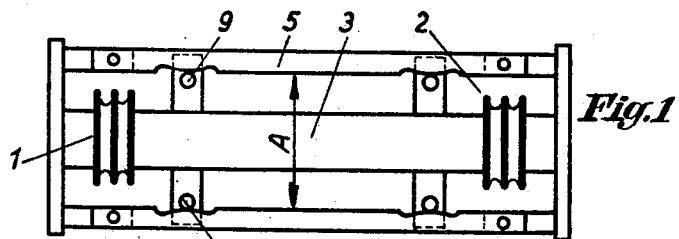
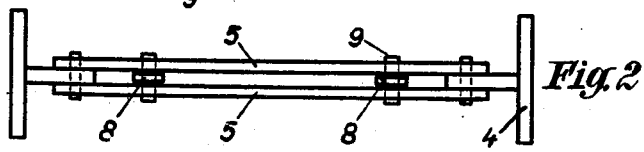
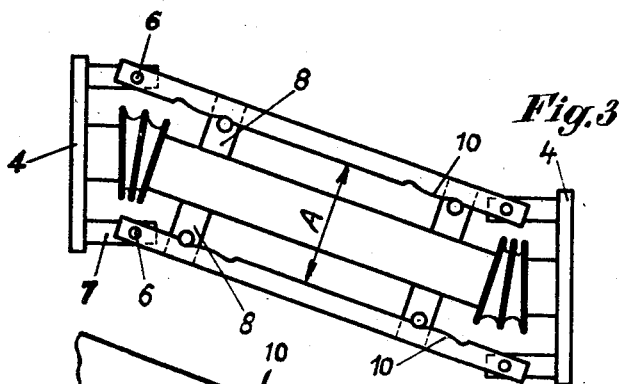
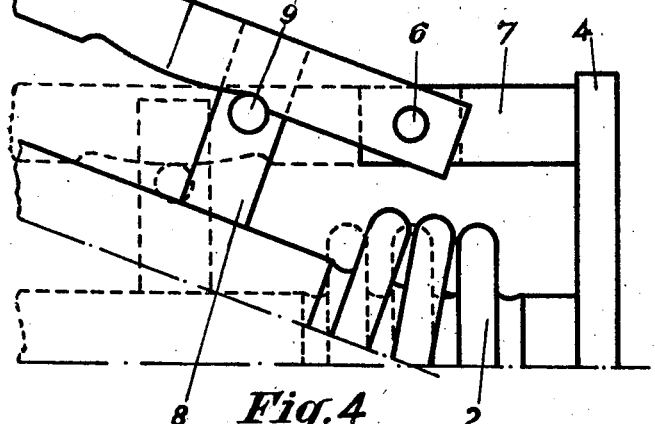
Inventors
Winfried Wiethüchter
and
Paul Eisele
By
Patent Agent

United States Patent Office 2,822,193
Patented Feb. 4, 1958

2,822,193

EXPANSION COMPENSATOR WITH STRAIN RELIEVING SUPPORT MEANS

Winfried K. P. E. Wiethüchter and Paul F. G. Eisele, Karlsruhe, Germany, assignors to Industrie-Werke Karlsruhe Aktiengesellschaft, Karlsruhe, Germany Application May 24, 1954, Serial No. 431,648

Claims priority, application Germany May 28, 1953

2 Claims. (Cl. 285—114)

The present invention relates to flexible compensators for expansions of pipes, also called articulated compensators. Such articulated compensators comprise two short steel bellows which are interconnected by a rigid intermediate pipe. The reaction forces resulting from the working pressure in the pipe due to the arranging in said pipe of a movable member, are absorbed by a parallelogram-like rod system which is connected to the two end flanges. Such articulated pipe expansion compensators absorb the longitudinal expansion of a pipe laterally in a plane.

The heretofore known expansion compensators of the above or similar type have the drawback that the turning points of the tie-rods are directly arranged on the end flanges as a result of which the metallic bellows or metallic hose is subjected to stress unilaterally and in an unfavorable manner so that at higher pressures there exists the danger of buckling.

It is, therefore, an object of the present invention to provide a flexible tube expansion compensator which will overcome the above mentioned drawbacks.

It is another object of this invention to provide an articulated compensator provided with bellows, which is so designed that the bellows will throughout their expansion be uniformly subjected to stress so that the life of said bellows is considerably increased.

It is a still further object of this invention to provide an articulated compensator having spaced bellows and an intermediate pipe connected thereto, which will prevent the yielding or deflecting of the intermediate pipe and thus will make impossible a buckling of the bellows.

These and other objects and advantages of the invention will appear more clearly from the following specification in connection with the accompanying drawing in which:

Fig. 1 represents a side view of a flexible tube expansion compensator according to the invention while occupying its intermediate position.

Fig. 2 illustrates a top view of the arrangement shown in Fig. 1. For the sake of clarity, intermediate pipe and bellows have been omitted.

Fig. 3 illustrates the tilted-out pipe expansion compensator according to the invention while occupying its end position.

Fig. 4 represents on a somewhat larger scale than that used in Figs. 1 to 3 a section of those parts particularly concerned in connection with the present invention, said parts occupying their end position, while the intermediate position of said parts is indicated by dashes.

General arrangement

According to the present invention, the pivot points of the rod system or tie-rods are located at the level of the center point of the bellows. To this end correspondingly long fishplates are welded to the back side of the end flanges. Due to this arrangement, the bellows are uniformly stressed throughout their entire length, which considerably increases the life of said bellows.

A further feature of the present invention consists in that the two ends of the intermediate pipe interconnecting the two bellows are automatically guided by the lever system. To this end, preferably, two fishplates arranged opposite each other are welded to the intermediate pipe, and the ends of the fishplates extend between the double tie-rods. Supporting bolts are passed through said fishplates and are connected in such a manner that when tilting the expansion compensators, the supporting bolts will slide along the tie-rods arranged in pairs. In this way a lateral yielding or deflecting of the intermediate pipe and thus a buckling of the bellows becomes impossible. Inasmuch as when moving the articulated tube expansion compensator from its intermediate position into its end position, the lever distance A (Figs. 1 and 3); i. e. the distance between the upper tie-rods and the lower tie-rods is reduced, while the distance between the supporting bolts remains constant, it could happen that with greater deflections, a clamping of the guiding rod system might occur. According to the invention such a situation is obviated by providing the inner edges of the tie-rods along the sliding areas with a correspondingly shaped recess. The curved sliding path is so designed that with each position of the expansion compensator, the intermediate pipe will be held in its desired position. As a result thereof, any jamming of the slide guiding means will be avoided.

Structural arrangement

Referring now to the drawing in detail, the arrangement shown therein comprises the two steel bellows 1 and 2 which are interconnected by an intermediate pipe 3. The free ends of the steel bellows are provided with connecting flanges 4. Both flanges are flexibly interconnected by means of a rod system comprising two pairs of tie-rods 5, joint bolts 6 and plates 7. The pivot points of the bolts 6 of the system of joints are located at the level of the center point of the bellows 1 and 2. Supporting bolts 9 are so arranged in the fishplates 8 which are welded to the intermediate pipe 3 that they can slide on the inner edge of the tie-rods 5. The sliding areas 10 are formed by curved recesses on the inner edges of the tie-rods 5 in such a manner that in each position of the pipe expansion compensator, the intermediate pipe 3 is positively held in the desired position.

It is, of course, understood that the present invention is, by no means, limited to the particular construction shown in the drawing but also comprises any modifications within the scope of the appended claims.

What we claim is:

1. A pipe expansion compensator comprising in combination: a substantially rigid pipe, two flexible tubular members respectively connected to the ends of said pipe and provided with flange portions, each of said flange portions being provided with two arms respectively arranged on opposite sides of the adjacent tubular member, two pairs of pivots respectively carried by the two arms of each flange portion, the axes of each two adjacent pivots being parallel to each other and being located in a plane substantially passing through that central axis of the adjacent tubular member which is parallel to the axes of the adjacent two pivots, a first substantially rigid link arranged on one side of said pipe and having each of its end portions respectively pivotally connected to one adjacent pivot on one and the same side of said pipe, a second substantially rigid link arranged on the opposite side of said pipe and having its end portions respectively pivotally connected to the other two pivots, said links being parallel to each other and each of said links being provided with two cam surfaces spaced from each other in longitudinal direction of said links, and spacer members rigidly connected to said pipes and spaced from each other in axial direction of said pipe and respectively slidably engaging the adjacent cam surfaces of said links, the contour of said cam surfaces compensating for the change in distance between said links as brought about by the pivotal movement of said links.

2. A pipe expansion compensator comprising in combination: a substantially rigid pipe, two flexible tubular members respectively connected to the ends of said pipe and provided with flange portions, each of said flange portions being provided with two arms respectively arranged on opposite sides of the adjacent tubular member, two pairs of pivots respectively carried by the two arms of each flange portion, the axes of each two adjacent pivots being parallel to each other and being located in a plane substantially passing through that central axis of the adjacent tubular member which is parallel to the axes of the adjacent two pivots, a first substantially rigid link arranged on one side of said pipe and having each of its end portions respectively pivotally connected to one adjacent pivot on one and the same side of said pipe, a second substantially rigid link arranged on the opposite side of said pipe and having its end portions respectively pivotally connected to the other two pivots, said links being parallel to each other and each of said links being provided with two cam surfaces spaced from each other in longitudinal direction of said links, each of said links also comprising two spaced bars having their respective ends straddle the adjacent arms of said flange portions, and spacer members rigidly connected to said pipes and spaced from each other in axial direction of said pipe and respectively slidably engaging the adjacent cam surfaces of said links, the contour of said cam surfaces compensating for the change in distance between said links as brought about by the pivotal movement of said links.

References Cited in the file of this patent

UNITED STATES PATENTS

| 993,934 | Witzenmann | May 30, 1911 |
| 2,335,478 | Bergman | Nov. 30, 1943 |
| 2,404,447 | Marancik et al. | July 23, 1946 |
| 2,493,404 | Haynes | Jan. 3, 1950 |
| 2,590,392 | Feilden | Mar. 25, 1952 |

FOREIGN PATENTS

| 8,823 | Great Britan | Apr. 26, 1905 |
| 629,161 | Germany | Apr. 23, 1936 |